United States Patent
Slipenchuk

(10) Patent No.: US 10,762,352 B2
(45) Date of Patent: Sep. 1, 2020

(54) METHOD AND SYSTEM FOR THE AUTOMATIC IDENTIFICATION OF FUZZY COPIES OF VIDEO CONTENT

(71) Applicant: Group IB, Ltd, Moscow (RU)

(72) Inventor: Pavel Vladimirovich Slipenchuk, Moscow (RU)

(73) Assignee: GROUP IB, LTD, Moscow (RU)

(*) Notice: Subject to any disclaimer, the term of this patent is extended or adjusted under 35 U.S.C. 154(b) by 70 days.

(21) Appl. No.: 16/239,610

(22) Filed: Jan. 4, 2019

(65) Prior Publication Data

US 2019/0220671 A1    Jul. 18, 2019

(30) Foreign Application Priority Data

Jan. 17, 2018   (RU) .................. 2018101761

(51) Int. Cl.
   *G06K 9/00*      (2006.01)
   *G06F 16/48*     (2019.01)

(52) U.S. Cl.
   CPC ......... *G06K 9/00758* (2013.01); *G06F 16/48* (2019.01); *G06K 9/00744* (2013.01); *G06K 9/00765* (2013.01)

(58) Field of Classification Search
   CPC ... G06F 16/48; G06F 16/739; G06K 9/00744; G06K 9/00758; G06K 9/00765;
   (Continued)

(56) References Cited

U.S. PATENT DOCUMENTS 7,225,343 B1    5/2007   Honig et al.
7,496,628 B2    2/2009   Arnold et al.
(Continued)

FOREIGN PATENT DOCUMENTS

CN    103491205 A    1/2014
CN    104504307 A    4/2015
(Continued)

OTHER PUBLICATIONS

Shukla, Dolley, and Manisha Sharma. "Overview of Scene Change Detection—Application to Watermarking." International Journal of Computer Applications 47.19 (2012). (Year: 2012).*
(Continued)

*Primary Examiner* — Li Liu
(74) *Attorney, Agent, or Firm* — BCF LLP

(57) ABSTRACT

There is disclosed a method to automatically identify fuzzy video content copies, which is performed on a computer device that has access to a previously generated database of original video content. The method comprises: receiving identifiers for video content; extracting each Nth frame from the video stream of received video content to obtain a sequence of frames, where N>1; identifying the sequence of scenes by comparing at least fragments of adjacent frames; creating a vector of the sequence of scenes of the received video content; comparing the vector of the sequence of scenes of received video content with the vector of the sequence of scenes of at least one template of original video content from a previously generated database of original video content; identifying a fuzzy copy of original video content when the sequence of scenes of original video content and scenes of received video content coincide to an extent that exceeds a predefined threshold.

18 Claims, 3 Drawing Sheets

(58) Field of Classification Search
CPC ....... G06K 2009/0059; G06K 9/00711; G06K 9/6202; G06T 1/0085; G06T 2201/0064; H04N 19/142; H04N 19/179; H04N 21/8456; H04N 5/147
See application file for complete search history.

(56) References Cited

U.S. PATENT DOCUMENTS

| | | |
|---|---|---|
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,655,031 B2 * | 2/2014 | Read ............ H04N 5/147 345/472 |
| 8,660,296 B1 | 2/2014 | Ioffe |
| 8,677,472 B1 | 3/2014 | Dotan et al. |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,917,852 B1 | 3/2018 | Xu et al. |
| 9,934,376 B1 | 4/2018 | Ismael |
| 2002/0161862 A1 | 10/2002 | Horvitz |
| 2003/0009696 A1 | 1/2003 | Bunker et al. |
| 2003/0063798 A1 * | 4/2003 | Li ............ G06K 9/00711 382/165 |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2009/0327334 A1 * | 12/2009 | Rodriguez ......... G06F 16/7837 |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0063635 A1 * | 3/2012 | Matsushita .......... G06T 1/0028 382/100 |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0110609 A1 * | 4/2016 | Lefebvre ........... G06K 9/00744 382/103 |
| 2016/0112445 A1 | 4/2016 | Abramowitz |
| 2016/0127907 A1 | 5/2016 | Baxley et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |

(56) References Cited

U.S. PATENT DOCUMENTS

| | | | |
|---|---|---|---|
| 2019/0207973 A1 | 7/2019 | Peng | |
| 2019/0373005 A1 | 12/2019 | Bassett | |
| 2020/0134702 A1 | 4/2020 | Li | |

FOREIGN PATENT DOCUMENTS

| | | |
|---|---|---|
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

Hampapur, Arun, Kiho Hyun, and Ruud M. Bolle. "Comparison of sequence matching techniques for video copy detection." Storage and Retrieval for Media Databases 2002. vol. 4676. International Society for Optics and Photonics, 2001. (Year: 2001).*
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 16/270,341 dated May 27, 2020.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—in the Notice of Allowance with regard to the counterpart U.S. Appl. No. 15/707,641.
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol . E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
European Search Report with regard to the counterpart EP Patent Application No. EP17210904 completed May 16, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
Office Action with regard to the counterpart U.S. Appl. No. 16/261,854 dated Oct. 21, 2019.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion dated Aug. 5, 2019 with regard to the counterpart SG Patent Application No. 10201900339Q.
Invitation to Respond to Written Opinion dated Aug. 5, 2019 with regard to the counterpart SG Patent Application No. 10201901079U.
Invitation to Respond to Written Opinion dated Jul. 31, 2019 with regard to the counterpart SG Patent Application No. 10201900335P.

(56) References Cited

OTHER PUBLICATIONS

Office Action with regard to the counterpart U.S. Appl. No. 15/858,013 dated Nov. 22, 2019.
Office Action received with regard to the counterpart U.S. Appl. No. 15/858,032 dated Apr. 6, 2020.
Notice of Allowance with regard to the counterpart U.S. Appl. No. 15/858,013 dated May 8, 2020.
Search Report with regard to the counterpart RU Patent Application No. 2018101761 completed Jun. 20, 2018.
Office Action with regard to the counterpart U.S. Appl. No. 15/707,641 dated Apr. 25, 2019.
Notice of Allowance with regard to the counterpart U.S. Appl. No. 15/858,013 dated Jun. 10, 2020.

* cited by examiner

METHOD AND SYSTEM FOR THE AUTOMATIC IDENTIFICATION OF FUZZY COPIES OF VIDEO CONTENT

CROSS-REFERENCE

The present application claims convention priority to Russian Utility Patent Application No. 2018101761, filed on Jan. 17, 2018, entitled "METHOD AND SYSTEM FOR THE AUTOMATIC IDENTIFICATION OF FUZZY COPIES OF VIDEO CONTENT", the entirety of which is incorporated herein by reference.

FIELD OF THE TECHNOLOGY

The non-limiting embodiments of the present technology are directed to identifying violations of intellectual property rights; in particular, methods and systems for automatically identifying copies of video content.

BACKGROUND

Every year the film industry loses billions of dollars due to the distribution of pirated copies that are published online and become instantly available to a large number of users. Piracy means copying and distributing works, in particular films, cartoons, clips, TV series, and other video content protected by copyright, without the permission of the author or owner, or in violation of the conditions of an agreement on the use of such works. According to the data of the company Group-IB an average pirate movie theater makes its owners an annual income of approximately $90,000, target audience outflow to pirate sites is approximately 60%, and loss of revenue suffered by media companies as a result of the actions of pirates may be as high as 45%.

The improvement in content distribution tools, concealment of pirated copies online, and increase in the scale of violations combine to make the development of mechanisms to detect and suppress piracy a priority. Broadly speaking, some of the requirements for the antipiracy solutions are speed, low search cost, and reduced involvement of the human analysts/assessors.

Traditional solutions to search for pirated video content use parsing of web pages. However, many web pages that contain pirated copies may be indistinguishable from pages with trailers that can be legally distributed. Also, for example, the first few episodes of a TV series may be freely distributed, so it is important to not only identify the TV series, but also to identify the specific episode whose duplicate is posted on a particular web resource.

Another method known in the art is metadata analysis, which allows a comparison of the length, frame size, recording quality, and other technical information. However, the search for a pirated copy of the sought film might be successful only when the copy is identical to the original, or not significantly different from it. When the original video content of the file is recoded, a fuzzy duplicate may be created, where the majority of its metadata may be different from the metadata of the original video content. A change of metadata is possible, for example, as a result of recoding or compressing the original video content, changing its length, by deleting or adding frames or entire sections (in particular, embedding advertisements), etc. Furthermore, it is possible to edit the metadata of a file separately.

To identify fuzzy copies of video content, an automated review algorithm that simulates user behavior may be used. An automated web browser algorithm that can test the content of web pages is known in the art (see, e.g., project Selenium).

There are known technical solutions that can extract various characteristics from the original video and compare them with the characteristics of the potential fuzzy copies that have been found. The disadvantages of these methods include an increased load on computer resources and data transmission networks, which is caused by the need to download the entire file of a potential fuzzy copy for analysis. Global experience in the battle against cybercrime shows that digital pirates use reliable tools to bypass traditional algorithms for the detection of pirated content. Metadata and the content of materials are changed: video content is cropped, noise is introduced, the color range is changed, etc. For this reason, developing new methods to detect pirated content that are substantially insensitive to video content changes is a very high priority in the art of identifying pirated copies of video content.

SUMMARY

The non-limiting embodiments of the present technology aim to automate and improve the quality of video content analysis in order to quickly and accurately identify fuzzy copies of video content.

The technical result of non-limiting embodiments of the present technology is the elimination of at least some shortcomings inherent in the known state of the art.

In accordance with a first broad aspect of the present technology, there is provided a method for automatically identifying a fuzzy video content copy, the method executable on a computer device that has access to an original content database. The method comprises: receiving an identifier of video content in a form of a video stream; extracting each Nth frame from the video stream to obtain a sequence of frames, where N is greater than one; identifying a sequence of scenes by comparing at least fragments of adjacent frames from the sequence of frames; creating, based on the sequence of scenes, a scene sequence vector; obtaining, from the original content database, a template vector representative of an original sequence of scenes of at least one template of an original video content; comparing the scene sequence vector with the template vector; in response to the comparing identifying that the scene sequence vector and the template vector overlap to a degree that exceeds a predefined threshold, identifying the video content as the fuzzy video content copy of the original video content.

In some implementations of the method, the method further comprises, prior to the receiving the identifier, performing a search for the video content on a data transmission network, the search being based on at least one search parameter search parameter selected from: keywords in a file name, keywords in a description, accompanying images, and file metadata.

In some implementations of the method, the method further comprises pre-defining the value N as a function of a length of video content.

In some implementations of the method, the identifying the sequence of scenes, comprises executing a comparison of extracted hash sums of at least fragments of adjacent frames, and wherein the method further comprises identifying a scene change in response to a Hamming distance between hash sums of adjacent frames exceeding a predefined threshold.

In some implementations of the method, the creating the scene sequence vector comprises generating the scene sequence vector based on a total number of frames in the scene.

In some implementations of the method, the scene sequence vector is a vector of at least two disjoint subsets of scenes of the received video content.

In some implementations of the method, the identifying the video content as the fuzzy video content copy of the original video content is executed based on the comparing the overlap of the scene sequence vectors of the at least two disjoint subset of scenes.

In some implementations of the method, during the comparing, the method further comprises additionally comparing at least one frame from the scene of the received video content with at least one frame from the corresponding scene of the original video content, forming at least one comparative pair of frames.

In some implementations of the method, the method further comprises extracting hash sums of the comparative pairs of frames and wherein the comparing the at least one frame comprises comparing hash sums.

In some implementations of the method, the method further comprises comparing meta data of the identified fuzzy copy of video content and metadata of the original video content, and wherein in response to a difference in compared metadata, the method further comprises executing an additional search for additional fuzzy copies of video content containing metadata identical to the metadata of the identified fuzzy copy of video content.

In some implementations of the method, a length of the fuzzy copy differs from the length of original video content.

In some implementations of the method, the method further comprises after identifying the fuzzy copy of video content, storing an identifier for the fuzzy copy of the video content in a fuzzy copy database.

In accordance with another broad aspect of the present technology, there is provided a method of creating a template of original video content, the method executable on a computer device. The method comprises: receiving identifiers for at least a portion of an original video content; extracting at least a portion of metadata of the original video content; extracting at least a portion of frames from a sequence of frames of the original video content; identifying a sequence of scenes; creating a vector of the sequence of scenes; generating a template of the original video content that includes at least the portion of the metadata, and a vector of the sequence of scenes of the original video content; storing the template in a database.

In some implementations of the method, the template includes at least one frame from each scene.

In accordance with yet another broad aspect of the present technology, there is provided a computer device configured to automatically identify fuzzy copies of video content, the computer device having access to a original video content database, the computer devices being connectable to a data transmission network; the computer device including a communication interface and at least one computer processor that is functionally connected to the communication interface. The processor being configured to: receive an identifier of video content in a form of a video stream; extract each Nth frame from the video stream to obtain a sequence of frames, where N is greater than one; identify a sequence of scenes by comparing at least fragments of adjacent frames from the sequence of frames; create, based on the sequence of scenes, a scene sequence vector; obtain, from the original content database, a template vector representative of an original sequence of scenes of at least one template of an original video content; compare the scene sequence vector with the template vector; in response to the comparing identifying that the scene sequence vector and the template vector overlap to a degree that exceeds a predefined threshold, identify the video content as the fuzzy video content copy of the original video content.

In some implementations of the device, the processor is further configured to perform a search for video content on a data transmission network, the search being based on at least one search parameter selected from: keywords in the a name, keywords in a description, accompanying images, and file metadata.

In some implementations of the device, the processor is further configured to perform a comparison of extracted hash sums of at least fragments of adjacent frames and to identify the boundary of the scene in response to the Hamming distance between hash sums of adjacent frames exceeding a predefined threshold.

In some implementations of the device, the processor is further configured to create the scene sequence vector based on a total number of frames in the scene.

In some implementations of the device, the processor is further configured to create the scene sequence vector based on at least two disjoint subsets of scenes of received video content.

In some implementations of the device, the processor is configured to identify the fuzzy copy of the original video content in response to the scene sequence vector of at least two disjoint subsets of scenes of received video content overlapping with at least a portion of the vector of the sequence of scenes of the original video content.

In the context of this description "fuzzy copy of video content" means a video that is approximately the same as the original video content, but may differ from the original video content in one or several of the following ways (without being so limited): coding parameters, photometric parameters (chromaticity, brightness), use of editing (frame, titles, logo, etc.). A "fuzzy copy of video content" may also be an identical video with relevant additional information or lack of at least part of the information, for example, additional advertisements, specific added and/or deleted frames or scenes, etc.

In the context of this description, "original video content" means any source video file concerning which a search and identification of fuzzy copies is performed. For example, original video content may be a film, pirated copies of which may need to be found and identified in order to block and suppress copyright violation.

In the context of this description, a "scene" of video content means a set of interconnected frames that, for example, were filmed in one shot, contain the same objects, actors, etc. Visual differences between a sequence of two or more adjacent frames in one scene are insignificant, and conversely, visual differences between the last frame of one scene and the first frame of the next scene differ substantially. The degree of similarity and difference may be predefined. For example, a coincidence of 20% or more between two frames may be considered significant.

In the context of this description, "vector of sequence of scenes" means an expression of the quantity of frames in scenes or the length of scene (scenes), a sequence of which forms video content.

In the context of this description, "computer device" means a computer program operating on relevant hardware, which is able to receive requests (for example, from client devices) via a network and to execute these requests or initiate the execution of these requests. The equipment may consist of one physical computer or one physical computer system, but neither is required for this invention. In the context of this description, the use of the expression "computer device" does not mean that each request (for example, received commands or requests) or any particular request will be received, executed, or have its execution initiated by the same "computer device" (that is, the same software and/or hardware); this means that any number of elements of software or hardware may be involved in receiving/transmitting, executing or initiating the execution of any request or consequence of any request related to the client device, and all this software and hardware may consist of a single computer device or several computer devices. Both options are included in the expression "at least one computer device."

In the context of this description, "database" means any structured set of data, regardless of the specific structure, the software used to manage the database, or the computer hardware on which the data is stored, used, or otherwise made accessible for use. The database may be located on the same hardware that runs the process that stores or uses the information stored in the database, or it may be located on separate hardware, for example, a dedicated server or set of servers.

In the context of this description, unless expressly indicated otherwise, the term "video content" or "content" means any visual or audio-visual data, which could be, for example, video files.

In the context of this description, unless expressly indicated otherwise, the "locator" or "identifier" of an information element may be the information element itself or a locator, reference, link, or other indirect method that allows the recipient of the identifier to find the network, memory, database, or other machine-readable medium from which the information element may be extracted. For example, an identifier for video content may include a video content file itself, or a set of video content files, or it may even be a uniform resource locator (for example, URL www.webpage-.com/videofile.avi) that identifies the video content in relation to a specific network (in particular, the Internet), or some other means to transfer the identifier to the recipient for a network folder, memory address, table in a database, or other place in which the video content or its individual fragments can be accessed. As will be understood by those skilled in the art, the degree of specificity required for such an identifier depends on the degree of originally understanding how the information exchanged by the sender and receiver of the locator should be interpreted. For example, if it is understood prior to transmitting data between the sender and recipient that the information element locator takes the form of a Universal Resource Locator (URL), transmitting the locator and link to this video content is all that is necessary to effectively transmit the video content to the recipient, despite the fact that the information element itself (for example, a film or a fragment of it) was not transmitted between the sender and recipient of the identifier.

In the context of this description, unless expressly indicated otherwise, the words "first," "second," third," etc. are used as adjectives solely in order to distinguish the nouns they modify from one another, and not for purposes of describing any specific relation between these nouns. For example, it should be borne in mind that the use of the terms "first scene" and "third scene" do not imply any sort of order, assignment to a specific category, chronology, hierarchy, or ranking (for example) of scenes within the set of scenes, similarly their use (by itself) does not imply that a certain "second scene" must exist in any given situation. Furthermore, as specified here in other contexts, mentioning a "first" element and a "second" element does not rule out the fact that they could actually be the same element. For example, in some cases, the "first" server and the "second" server may be the same software and/or hardware, and in other cases they may be different software and/or hardware.

In the context of this description "machine-readable medium" means a medium of absolutely any type and nature, including RAM, ROM, disks (CDs, DVDs, floppy disks, hard disks, etc.), USB flash drives, solid state drives, tape drives, etc.

Additional and/or alternative features, aspects, and advantages of different embodiments of this invention will be apparent from the following description, drawings, and claims.

BRIEF DESCRIPTION OF THE DRAWINGS

In order to better understand the non-limiting embodiments of the present technology, as well as its other aspects and characteristic features, reference is made to the following description, which should be used in conjunction with the accompanying drawings, where.

DETAILED DESCRIPTION OF THE NON-LIMITING EMBODIMENTS

The following description serves only as a description of an illustrative example of the non-limiting embodiments of the present technology. This description is not intended to define the scope or establish limitations on the non-limiting embodiments of the present technology.

Some useful examples of modifications to the described method and system for identifying malicious web resources may also be covered by the following description. The goal of this is also exclusively to assist in understanding, and not to define the scope or limitations to the non-limiting embodiments of the present technology. These modifications do not constitute an exhaustive list, and persons skilled in the art will recognize that other modifications are possible. Furthermore, it should not be interpreted in such a way that no modifications are possible where no examples of modifications have been stated, and/or that something described is the only option for implementing a certain element of the non-limiting embodiments of the present technology. As will be clear to a person skilled in the art, this is most likely not the case. Furthermore, it should be borne in mind that, for several specific manifestations, the method and system for automatically identifying fuzzy copies of video content consist of simple different embodiments of this invention, which in such cases are presented here in order to facilitate understanding. As a person skilled in the art will understand, many different embodiments of the non-limiting embodiments of the present technology will possess much greater complexity.

Figure 1:
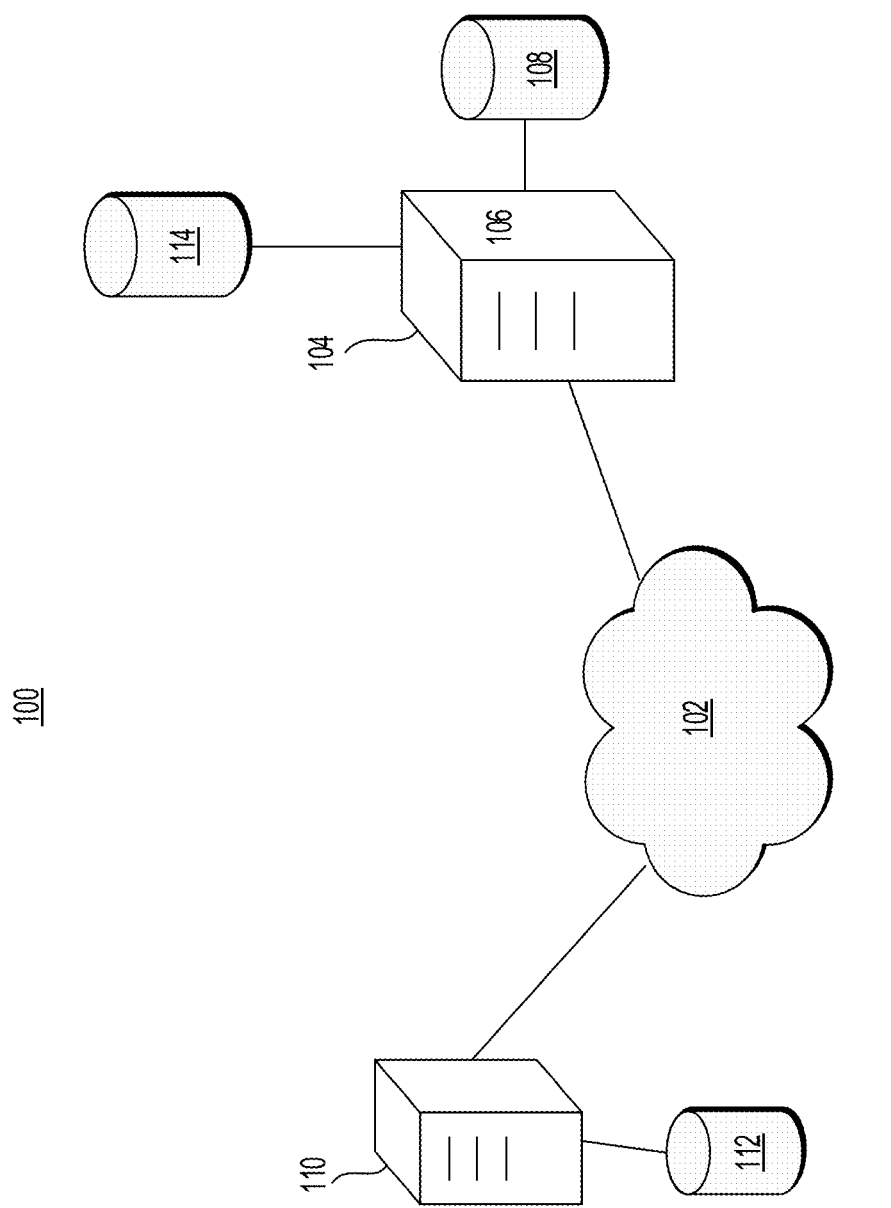
FIG. 1 is a simplified schematic representation of one of the non-limiting implementations of a system to embody the non-limiting embodiments of the present technology.

FIG. 1 is a simplified schematic representation of one of the non-limiting implementations of system 100 to embody the non-limiting embodiments of the present technology.

In some non-limiting embodiments of the non-limiting embodiments of the present technology, a system 100, which implements the method, may include a data transfer network 102, at least one computer device 104 to automatically identify fuzzy copies of video content (hereinafter computer device 104), at least one processor 106 included in the computer device 104, and a original video content database 108. The system 100 may also include at least one search engine 110, which has access to the video content database 112. The system 100 may also include a fuzzy copies of video content database 114, where fuzzy copies of original video content that have been identified during the performance of the described method may be saved.

The data transmission network 102 may be implemented, for example, as the Internet or any other computer network.

The computer device 104 may be an ordinary computer server. In the example embodiment of the present technology, the computer device 104 may be a Dell™ PowerEdge™ server, which uses the Ubuntu Server operating system. The computer device 104 may be any other suitable hardware and/or application software and/or system software, or a combination thereof. In this non-limiting embodiment of the present technology, the computer device 104 is a single server. In other non-limiting embodiments of the present technology, the functionality of the computer device 104 may be divided among several computer devices, and, for example, may be provided by several servers.

In some non-limiting embodiments of the present technology, the computer device 104 may be a personal computer (desktop, laptop, etc.). Implementations of the computer device 104 are well known. Thus, it is sufficient to note that the computer device 104 includes, among other things, a data transmission network interface (for example, a modem, network map, etc.) for two-way communication over the data transmission network 102; and at least one processor 106, connected to the data transmission network interface, where the processor 106 is configured to perform various procedures, including those described below. The processor 106 can have access to machine-readable instructions stored on machine-readable medium (not shown), the execution of which initiates processor 106 implementing various procedures described here. In some alternative non-limiting embodiments of the present technology, at least some of the operations described herein are performed by a graphics-processing unit (GPU, not shown).

In some embodiments of the present technology, the computer device 104 includes one or more databases 108, which are configured to store previously generated templates of original video content, where each template includes at least part of metadata, the vector of the sequence of scenes of original video content. In some alternative non-limiting embodiments of the present technology, the template also includes at least one frame from each scene. In some alternative non-limiting embodiments of the present technology, an identifier of the original video content file and/or the original video content file itself are stored in the original video content database 108.

Although the original video content database 108 is represented as separate from the computer device 104, to which it is connected using a corresponding line (not numbered), the original video content database 108 may be implemented as part of the computer device 104 or may be available to the computer device 104 by other means. Similarly, fuzzy copies of video content database 114, shown in FIG. 1 as separate from the computer device 104, with which it is connected using an appropriate line (not numbered), may be implemented as part of the computer device 104 or may be available to the computer device 104 by other means. In yet further non-limiting embodiments of the present technology, the original video content database 108 and the fuzzy copies of video content database 114 may be implemented on the same physical device or on separate devices.

In yet further non-limiting embodiments of the present technology, the computer device 104 includes machine-readable medium (not shown), on which machine-readable instructions and/or the original video content database 108 and/or the fuzzy copies of video content database 114 may be stored in advance. Alternatively or additionally, the computer device 104 may have access to machine-readable instructions and/or the original video content database 108 and/or the fuzzy copies of video content database 114, which may be located on other hardware.

The processor 106 is configured to receive identifiers of video content. As a non-limiting example, receiving identifiers for video content may entail receiving a single uniform resource locator (URL). The source or sources of identifiers for video content may be diverse.

In some non-limiting embodiments of the present technology, the processor 106 is configured to obtain identifiers of video content at least partially from an external source via the data transmission network 102. For example, an external source might be the search engine 110 configured to perform vertical searches of video content that has access to the video content database 112 and/or a video hosting server (not shown) on which video content is posted, etc. Moreover, the computer device 104 may have access to the video content database 112 via the data transmission network 102. Alternatively or additionally, an external source may be a web resource, including identifiers of the video content.

Thus, exactly how and by what principle identifiers of the video content are grouped on an external source, in particular, on the video content database 112, are not particularly limiting. In some non-limiting embodiments of the present technology, the video content database 112 is preloaded with classifications of video content according to one or more parameters.

In the example embodiment of the present technology, the search engine 110 may be a Dell™ PowerEdge™ server, which uses the Ubuntu Server operating system. Search engine 110 may be any other suitable hardware and/or application software and/or system software, or a combination thereof. In this non-limiting embodiment of the present technology, the search engine 110 is a single server. In other non-limiting embodiments of the present technology, the functionality of the search engine 110 may be distributed, and may be provided by several servers.

Embodiments of the search engine 110 are well known. Thus, the search engine 110 includes, among other things, a data transmission network interface (for example, a modem, network card, etc.) for two-way communication over the data transmission network 102; and a processor (not shown), connected to the data transmission network interface, where the processor is configured to search video content on the data transmission network 102 and store it in the video content database 112. The, the search engine processor can have access to relevant machine-readable instructions stored on a machine-readable medium (not shown).

The process of populating and saving the video content database 112 is generally known as "data crawling". The search engine 110 is configured to "visit" various web resources, websites, and webpages, including search engines, video hosting sites, social networks, etc. that are accessible via the data transmission network 102, and save video content identifiers in the video content database 112 based on one or more predefined parameters. As a non-limiting example, the search engine 110 can scan the data transmission network 102 and save identifiers for the video content from, for example, web pages that include certain keywords in one or more languages, or other accompanying content, such as, for example, movie posters, trailers, film descriptions, etc. The search and selection parameters for video content, as well as specific web resources on which the search may be performed, are not specifically limited. As an example, a search may be conducted on search engines, in particular, Yandex search engine, Google search engine, etc. In this regard, a search query to search for video content that potentially violates copyrights may be "free download in high quality" or "watch for free." Search queries may also include names or portions of names of specific original video content, for example, names of recently released films or TV shows; examples of such search queries might be "title_of_movie stream," "title_of_movie download" etc. Algorithms to search for information on the Internet are well known; one or several different approaches may be used for the purposes of implementing non-limiting embodiments of the present technology.

Figure 3:
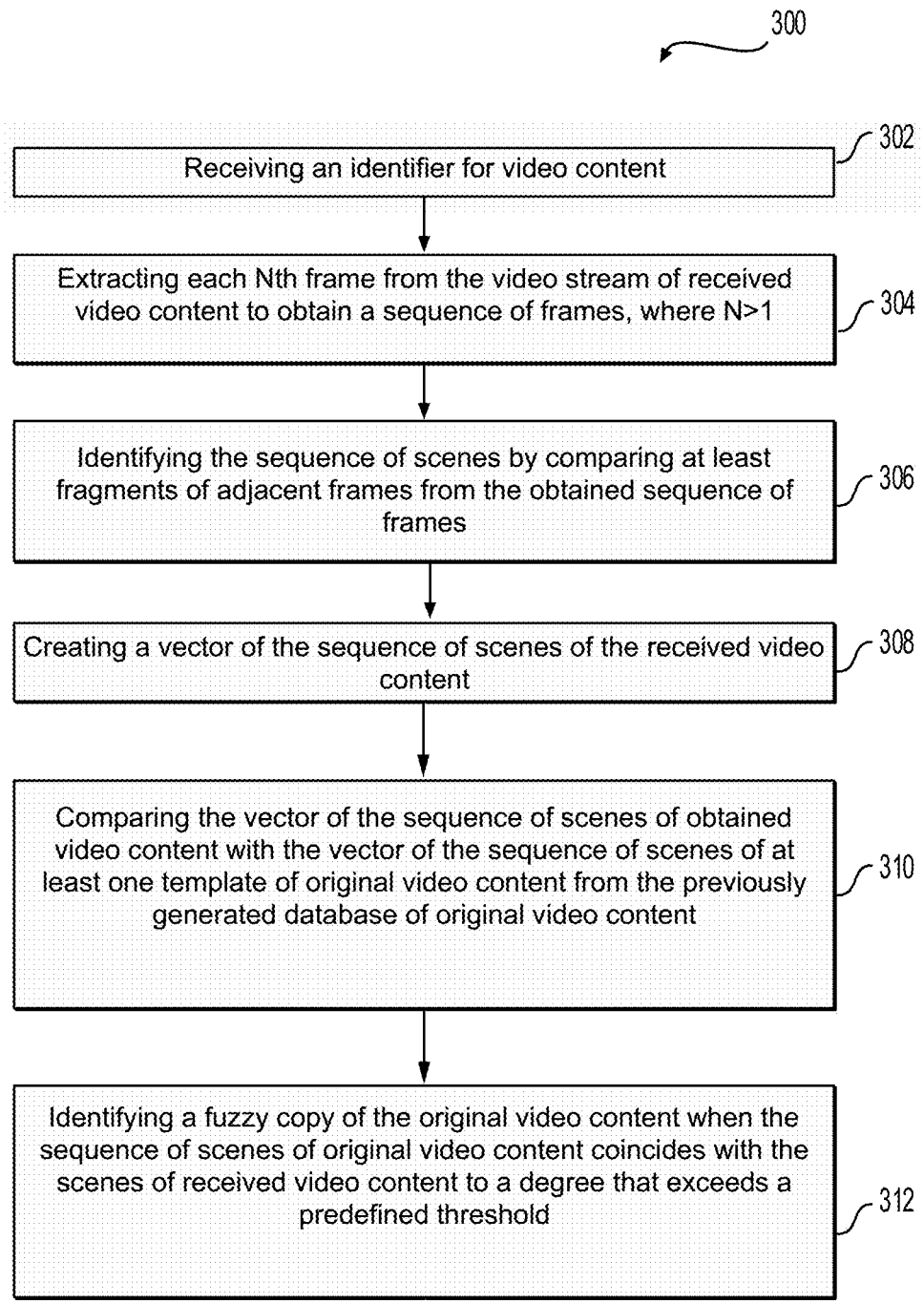
FIG. 3 is a flowchart that illustrates the aspect of this method for automatically identifying fuzzy copies of video content.

The so-detected and selected identifiers for video content that potentially may violate copyrights are saved in video content database 112. Then they may be received by the processor of the computer device 104 via the data transmission network 102 from the search engine 110 in order to perform the method of automatically identifying fuzzy copies of video content, which will be described in more detail below with reference to FIG. 3.

In some non-limiting embodiments of the present technology, the processor 106 of the computer device 104 is configured to obtain identifiers for video content directly from the video content database 112. Thus, the video content database 112 may be implemented as part of the computer device 104 or be accessible to the computer device 104 by other means.

T In some non-limiting embodiments of the present technology, the processor 106 is configured to scan the data transmission network 102 in order to obtain identifiers for video content and in the same way the computer device 104 can perform the functionality of search engine 110 described above.

In some non-limiting embodiments of the present technology, the processor 106 of the computer device 104 is configured to create templates of original video content and thereby generate and populate the original video content database 108. Alternatively or additionally, the creation of templates of original video content and generation of original video content database 108 may also be executed by one or more different computer devices (not shown).

Figure 2:
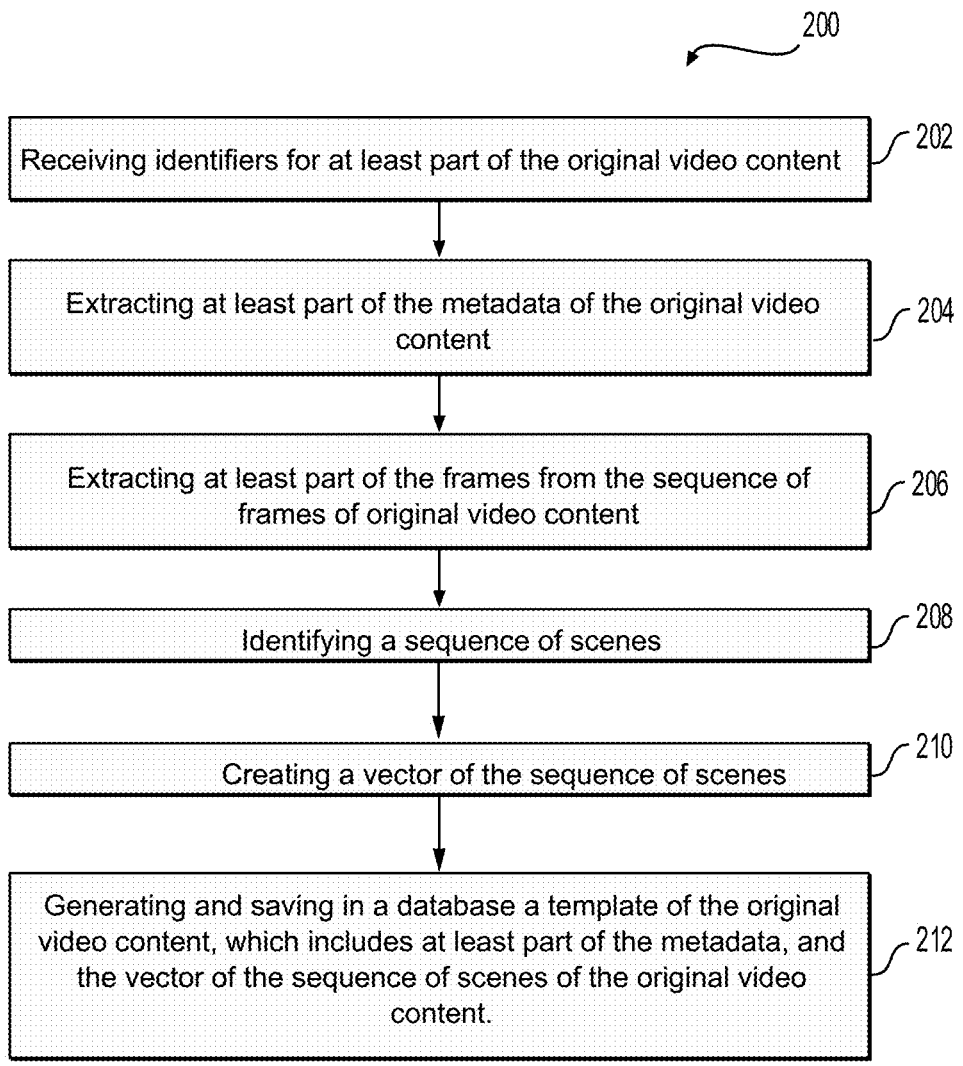
FIG. 2 is a flowchart that illustrates the aspect of this method for creating a template of the original video content.

With reference to FIG. 2, a method 200 for creating a template of original video content in the original video content database 108 will be discussed in more detail. The method 200 may be performed on the computer device 104 and, specifically, by the processor 106 of the computer device 104 as in the non-limiting embodiment of system 100 shown in FIG. 1.

Step 202—Receiving Identifiers for at Least Part of the Original Video Content The method 200 begins at step 202, where the computer device 104 receives identifiers for at least a portion of the original video content. Identifiers for at least the portion of the original video content may be video content files themselves, or, for example, links to video content, URLs that are accessible to the computer device 104 via the data transmission network 102 or another network (not shown). The source or sources of original video content may be diverse, as an example, but this is not a limitation; the computer device 104 may receive identifiers for at least the portion of the original video content via the data transmission network 102 from another computer device (not shown) connected to the data transmission network 102 or via machine-readable medium (not shown), which may be connected to the computer device 104. The range of persons from whom identifiers for at least the portion of the original video content may be received is not specifically limited. For example, this may be the copyright owner, a representative of the copyright owner, law enforcement agencies, or other organizations involved in protecting copyrights, etc. who wish to detect and suppress the distribution of pirated copies of original video content.

At least the portion of the original video content may be, for example, full video content or a fragment thereof (in particular a fragment of a movie, TV show, etc.). In this case, the minimum length of such a fragment may be preset for video content of various types to ensure the most accurate identification of fuzzy copies of original video content. For a music video or other video content that features frequent scene changes, the minimum length may be, for example, 1 minute, for a film 10 to 15 minutes, for a TV show 5 to 8 minutes, etc. These minimum lengths are not limiting and are used only for purposes of examples. It will be obvious to a person skilled in the art, considering the following description of stages of method 300 for automatically identifying fuzzy copies of video content, that the more complete the received (at least) portion of original video content, the greater the quantity of different fuzzy copies of video content that may be discovered.

Then method 200 then proceeds to step 204.
Step 204—Extracting at Least Part of the Metadata of the Original Video Content During step 204, the processor 106 of the computer device 104 extracts at least a portion of the metadata of the original video content. Video content metadata may include, in particular, name, description, tags, length, language, comments, file format, file size, frame size, frame rate, subtitles, date of creation, type of video content, place and date of filming, GPS coordinates, etc. Methods to automatically extract metadata from a video file are well known and are not the subject of this patent.

Then method 200 then proceeds to step 206.
Step 206—Extracting at Least Part of the Frames from the Sequence of Frames of Original Video Content During step 206, the processor 106 of the computer device 104 extracts at least a portion of the frames from the sequence of frames of the original video content. The video stream of the original video content is broken down into separate frames. In order to decrease the load on computing resources and increase processing speed, in at least some non-limiting embodiments of the present technology, the frames are extracted at a sampling rate of D frames per minute, where D>1. As a non-limiting example, D may be equal to 60, in which case, when the frame rate is 30 frames per second, every 30th frame would be extracted. A sequence of frames with step 1 or greater than 1 is obtained depending on the value of D. The value of D may be preset, or set automatically by a function, for example, depending on the size and length of video content and/or other parameters that can be obtained during step 204, extracting original video content metadata.

In at least some non-limiting embodiments of the method 200, the extracting at least the portion of the metadata of the original video content, and the extracting at least portion of the frames of the sequence of frames of the original video content, can be performed in parallel after step 202. In another non-limiting embodiment of the method 200, step 206 (extracting at least part of the metadata of the original video content), can be performed after step 204 (extracting at least part of the frames of the sequence of frames of the original video content).

Then method 200 then proceeds to step 208.

Step 208—Identifying a Sequence of Scenes

During step 208, the processor 106 of the computer device 104 identifies a sequence of scenes of the original video content. Identifying a sequence of scenes could be performed, for example, by comparing adjacent frames from the received sequence of frames. In the case where the sampling rate D>1, the comparison of frames is performed with the appropriate sampling rate. For example, if D is equal to 60 frames per minute and the frame rate is 30 frames per second, then the sequence of frames from the video stream to be compared is a sampling of every 30th frame (the 30th frame is compared with the 60th, 60th with 90th, 90th with 120th, etc.). In some non-limiting embodiments of the present technology, in order to lower the burden on computing power, the comparison is executed not of the whole frame, but one or several portions thereof, for example, one or several fields in a central part of the frame.

In order to compare adjacent frames, a hash sum of the comparative frames or one or several portions of the comparative frames may be extracted from the received sequence of frames. Then processor 106 computes the Hamming distance P(x) between hash sums of comparative frames. When the Hamming distance between hash sums of comparative frames or portions of frames exceeds a predefined threshold, then it is defined as a scene change. The predefined threshold may be, for example, 15-30%. If the similarity of hash sums exceeds the threshold value, then they are considered to be frames in the same scene.

Thus, comparing pairs of frames or pairs of parts of frames allows the identification of sequences of scenes in original video content and the length of each of the scenes in the sequence of scenes.

Then method 200 then proceeds to step 210.

Step 210—Creating a Vector of the Sequence of Scenes

During step 210, the processor 106 of the computer device 104 creates a vector of the sequence of scenes of the original video content. The vector can contain data on the length of each scene that was identified during step 208 of the method 200. The length of scenes can be expressed, for example, in seconds or minutes, or in absolute or relative number of frames per scene. Absolute number of frames per scene means the number of frames of the video stream, and relative number of frames per scene means the number of extracted frames, taking into consideration the sampling rate. For example, if every 30th frame is extracted, then the relative values of the vector might contain the quantity of extracted frames (the relative value would be 20 when the absolute value is 600).

In a non-limiting example of the embodiment, the vector of original video content containing nine scenes may looks as follows:

$V_1$=(20; 230; 430; 150; 340; 230; 340; 560; 105)

Then method 200 then proceeds to step 212.

Step 212—Generating and Saving in a Database a Template of the Original Video Content, which Includes at Least Part of the Metadata, and the Vector of the Sequence of Scenes of the Original Video Content During step 212, the processor 106 of the computer device 104 generates a template of original video content, the template includes at least a portion of the metadata of the original video content obtained during step 204, as well as the vector of the sequence of scenes obtained at step 210. Then the generated template of original video content is saved in original video content database 108.

In at least some non-limiting embodiments of the present technology, at least one frame or part of a frame of each scene is extracted and saved in the template of original video content.

The template of video content is, in a general sense, a structured set of data associated with the specific original video content. Creating a template helps to reduce the burden on the system's computing resources substantially when searching for found video content and comparing it with the original video content to identify fuzzy copies, which will be shown in more detail in the description of method 300.

After step 212, the method 200 may terminate.

Original video content database 108 may be populated according to the disclosed method 200 described above by one or several different computer devices.

Next, referring to FIG. 1 and FIG. 2, a method 300 for automatically identifying fuzzy copies of video content will be described. Method 300 may be performed on the computer device 104 and, specifically, by the processor 106 of the computer device 104 as in the non-limiting embodiment of system 100 shown in FIG. 1.

Step 302—Receiving an Identifier for Video Content

Method 300 begins at step 302, where the computer device 104 receives an identifier for video content. The identifier may be a video content file itself, or, for example, links to video content, URLs that are accessible to the computer device 104 via the data transmission network 102 or another network (not shown).

The identifier may be received in particular from the search engine 110 or directly from the video content database 112.

In at least some non-limiting embodiments of the method 300, the processor 106 of the computer device 104 can perform a search of video content on the data transmission network 102, where the search is performed according to one or more of the following parameters: keywords in the file name, keywords in the description, accompanying images, file metadata. The search can be performed before, concurrently, or after performing the step 302.

The search criteria are not specifically limited. In at least some non-limiting embodiments of the method 300, the search is performed according to specific parameters of a given original video content, fuzzy copies of which (including identical copies) are to be found. Alternatively or additionally, the search may be performed over all video content that is accessible via data transmission network 102 or on a specific web resource. So, as a non-limiting example, during step 302 the processor 106 of the computer device 104 may receive identifiers for any new video content published on the social network VKontakte in order to identify fuzzy copies of original video content, templates of which were previously generated and saved in original video content database 108 through method 200 described above. A further verification may be performed in relation to one or more different templates of original video content.

Then method 300 then proceeds to step 304.

Step 304—Extracting Each Nth Frame from the Video Stream of Received Video Content to Obtain a Sequence of Frames, where N>1;

During step 304, the processor 106 of the computer device 104 extracts each Nth frame of the video stream of received video content and obtains a sequence of frames. The video stream of the video content is broken down into separate frames. In order to decrease the load on computing resources and increase the speed of automatically identifying fuzzy copies of video content, frames are extracted with a sampling rate of N frames per minute, where N>1. As a non-limiting example, N may be equal to 60, in which case, when the frame rate is 30 frames per second, every 30th frame would be extracted. A sequence of frames with step greater than 1 is obtained depending on the value of N. The value of N may be preset, or set automatically by a function, for example, depending on the size and length of video content and/or other parameters.

For video content characterized by frequent scene changes, for example, video clips, the value of N may be set as equal to, for example, 120. For less dynamic video content characterized by rare scene changes (for example, video lectures), the value of N can be set, for example, to 2000. The converse embodiment is also possible, where the value of N for less dynamic video content is less than the value of N for more dynamic content, or generally does not depend on the type of video content and other parameters, but has a constant value, for example, 60. The above-described values of N are not limiting and given only as illustrative examples to facilitate understanding.

Then method 300 then proceeds to step 306.

Step 306—Identifying the Sequence of Scenes by Comparing at Least Fragments of Adjacent Frames from the Obtained Sequence of Frames;

During step 306, the processor 106 of the computer device 104 identifies a sequence of scenes of video content. Identifying a sequence of scenes could be done, for example, by comparing adjacent frames from the received sequence of frames with step N. So, for example, if N is equal to 60 frames per minute and the frame rate is 30 frames per second, then the sequence of frames from the video stream to be compared is a sampling of every 30th frame (the 30th frame is compared with the 60th, 60th with 90th, 90th with 120th, etc.). In at least some non-limiting embodiments of the method 300, in order to lower the burden on computing resources, a comparison is made of, not the whole frame, but one or more parts thereof (fragments), for example, one or more fields, for example in the central part of the frame, the upper right portion of the frame, the lower left portion of the frame, etc. Embodiments of identifying fragments are not specifically limited and may depend on the type of video content and the most dynamic fragments of the frame. They may be identified in advance on the basis of statistical data or basic principles of frame construction (composition) that are used by operators during shooting.

In at least some non-limiting embodiments of the method 300, during the step of identifying scene changes (scene boundaries), a comparison of extracted hash sums of at least fragments of adjacent frames is performed in response to the Hamming distance between hash sums of adjacent frames exceeds a predefined threshold; the boundary of the scene (scene change) is identified. In order to compare adjacent frames, a hash sum of the comparative frames or one or several parts of the comparative frames may be extracted from the received sequence of frames. Then the processor 106 computes the Hamming distance P(x) between hash sums of comparative frames. In response to the Hamming distance between hash sums of comparative frames or parts of frames exceeds a predefined threshold, then it is defined as a scene change. The predefined threshold may be, for example, 15-30%. If the similarity of hash sums exceeds the threshold value, then they are considered to be frames in the same scene.

Thus, comparing pairs of frames or pairs of parts (fragments) of frames allows the identification of sequences of scenes in received video content and the length of each of the scenes in the sequence of scenes.

In at least some non-limiting embodiments of the method 300, the steps 304 and 306 of the method are performed in parallel.

Then method 300 then proceeds to step 308.

Step 308—Creating a Vector of the Sequence of Scenes of the Received Video Content;

During step 308, the processor 106 of the computer device 104 creates a vector of the sequence of scenes of received video content, which can contain data on the length of each scene that was identified during step 306 of method 300. The length of scenes can be expressed, for example, in seconds or minutes, or in absolute or relative number of frames per scene. Absolute number of frames per scene means the number of frames of the video stream, and relative number of frames per scene means the number of extracted frames, taking into consideration step N. For example, if every 30th frame is extracted, then the relative values of the vector might contain the quantity of extracted frames (the relative value would be 20 when the absolute value is 600).

In at least some non-limiting embodiments of the method 300, the vector of the sequence of scenes of received video content is a vector of at least two disjoint subsets of scenes of received video content.

Some illustrative examples of vectors of received video content, for the purpose of further illustrating the description of the method 300, are given below:

Example 1: $V_2$=(20; 230; 430; 150; 120; 340; 230; 180; 340; 560; 105)

Example 2: $V_3$=(230; 430; 150; 120; 340; 230; 180; 340; 560)

Example 3: $V_4$=(33; 230; 430; 150; 340; 230; 340; 560; 105; 700; 388; 222; 250; 92; 170; 800; 448; 590; 75; 33; 620)

Then method 300 then proceeds to step 310.

Step 310—Comparing the Vector of the Sequence of Scenes of Obtained Video Content with the Vector of the Sequence of Scenes of at Least One Template of Original Video Content from the Previously Generated Database of Original Video Content During step 310, the processor 106 of the computer device 104 compares the vectors of the sequence of scenes of received video content with the vector of the sequence of scenes of at least one template of original video content from a previously generated original video content database 108.

Before comparison, the vectors may be converted into a common format, for example, if the vector of original video content was created on the basis of the total number of frames in the video stream of original video content, but the vector of received video content was created on the basis of the number of frames of a sequence with step N.

In these illustrative examples the vector of original video content $V_1$=(20; 230; 430; 150; 340; 230; 340; 560; 105) and examples of vectors of received video content ($V_2$, $V_3$, $V_4$) are converted to a common format.

Vector differences are determined from the results of the comparison (differences are shown in bold):

Example 1: $V_2$=(20; 230; 430; 150; 120; 340; 230; 180; 340; 560; 105)

Example 2: $V_3$=(230; 430; 150; 120; 340; 230; 180; 340; 560)

Example 3: $V_4$=(33; 230; 430; 150; 340; 230; 340; 560; 105; 700; 388; 222; 250; 92; 170; 800; 448; 590; 75; 33; 620)

In at least some non-limiting embodiments of the method 300, the permissible error rate for the comparison of vectors is preset. For example, the error rate could be 5-10%. Accordingly, when comparing vectors with scene lengths, for example, of 200 and 220, they may be equated to one another and considered equal. This error may arise, for example, by deleting part of the frames in the fuzzy copy, or by selecting step N of received video content greater or lower than step D of the sequence of frames of original video content. As will be understood by persons skilled in the art, other factors can also affect the error rate, which can be offset by the predefined acceptable error rate.

In at least some non-limiting embodiments of the method 300, during step 310, when comparing the vector of the sequence of scenes of received video content with the vector of the sequence of scenes of at least one template of original video content, a comparison is also performed of at least one frame from the scene of received video content with at least one frame from the corresponding scene of original video content, forming at least one comparative pair of frames. In at least some non-limiting embodiments of the method 300, hash sums are extracted and the hash sums of a comparative pair of frames are compared. In this case, the consistency of the comparison result is complicated by the fact that hashes of comparative images differ by a small number of bits as compared with the size of the image, which facilitates finding the Hamming distance between image data hashes.

Comparing separate frames facilitates carrying out a spot check that one or several scenes match, in order to increase the accuracy of the claimed method.

Then method 300 then proceeds to step 312.

Stage 312—Identifying a Fuzzy Copy of the Original Video Content in Response to the Sequence of Scenes of Original Video Content Overlap with the Scenes of Received Video Content to a Degree that Exceeds a Predefined Threshold During step 310, the processor 106 of the computer device 104 identifies a fuzzy copy of the original video content in response to the sequence of scenes of original video content overlapping with the scenes of received video content to a degree that exceeds a predefined threshold.

In at least some non-limiting embodiments of the method 300, the vector of at least two disjoint subsets of scenes of received video content is identified as the vector of a fuzzy copy of the original video content in response to it overlapping with at least part of the vector of the sequence of scenes of original video content. As shown in the illustrative example of vectors, $V_2$=(20; 230; 430; 150; 120; 340; 230; 180; 340; 560; 105) and $V_3$=(230; 430; 150; 120; 340; 230; 340; 560)

In Example 2 of vector $V_3$, between the sequence of scenes with length 230; 430; 150; and scenes of length 340; 230; 340; 560 that match the length of scenes of original video content there is a scene with length 120 that is missing in the vector of original video content.

In Example 1 vector $V_2$=(20; 230; 430; 150; 120; 340; 230; 180; 340; 560; 105) has two scenes of length 120 and 180 that are missing in the vector of the original video content $V_1$=(20; 230; 430; 150; 340; 230; 340; 560; 105).

In response to some different sequences of scenes overlapping, received video content with vector $V_2$=(20; 230; 430; 150; 120; 340; 230; 180; 340; 560; 105) and received video content with vector $V_3$=(230; 430; 150; 120; 340; 230; 340; 560) can be identified as a fuzzy copy of the original video content with vector $V_1$=(20; 230; 430; 150; 340; 230; 340; 560; 105). The scenes of length 120 and 180, in this illustrative example, can be, for example, an advertisement that was embedded into the original video content when the fuzzy copy was created.

In at least some non-limiting embodiments of the method 300 the length of the fuzzy copy can differ from the length of the original video content.

In illustrative Examples 1 and 2 (vectors $V_2$ $V_3$), the lengths of fuzzy copies differ from the length of the original video content due to embedded advertising, as well as in Example 2 (vector $V_3$) due to deleting the first scene with length 20 and the last scene (for example, credits) with length 105 relative to the original video content. In Example 3 (vector $V_4$=(33; 230; 430; 150; 340; 230; 340; 560; 105; 700; 388; 222; 250; 92; 170; 800; 448; 590; 75; 33; 620;)), the length of the fuzzy copy is substantially increased and can match, for example, two combined vectors of the original video content. This is possible, for example, when two episodes of original video content are combined in a single fuzzy copy.

As will be understood to persons skilled in the art, other techniques are also possible, which can be used to create fuzzy copies of video content based on one or more copies of original video content.

After step 312, method 300 may terminate.

In at least some non-limiting embodiments of the method 300, after identifying a fuzzy copy of video content, the processor 106 saves the identifier for the video content in database 114 of fuzzy copies. Then the obtained data can be sent to the copyright holder, and measures can also be taken to automatically block the detected fuzzy copy.

In at least some non-limiting embodiments of the method 300, the processor 106 is configured to perform an additional search for fuzzy copies of video content containing metadata identical to the metadata of the identified fuzzy copy of video content when the metadata of an identified fuzzy copy of video content differs at least partially from the metadata of the original video content. Next, the identified additional fuzzy copies can be checked using method 300 described above, or immediately saved in database 114 of fuzzy copies.

The disclosed method to automatically identify fuzzy copies of video content may ensure high speed and accuracy, as well as a substantial reduction in the burden on computing resources.

Modifications and improvements to the above-described embodiments of the present technology will be clear to persons skilled in the art. The preceding description was given only as an example and does not impose any limitations. Thus, the scope of the present technology is limited only by the scope of the appended claims.

The invention claimed is:

1. A method for automatically identifying a fuzzy video content copy, the method executable on a computer device that has access to an original content database;
the method comprising:
receiving an identifier of video content in a form of a video stream;
extracting each Nth frame from the video stream to obtain a sequence of frames, where N is greater than one;
identifying a sequence of scenes by comparing at least fragments of adjacent frames from the sequence of frames;
creating, based on the sequence of scenes, a scene sequence vector;

obtaining, from the original content database, a template vector representative of an original sequence of scenes of at least one template of an original video content;

comparing the scene sequence vector with the template vector;

in response to the comparing identifying that the scene sequence vector and the template vector overlap to a degree that exceeds a predefined threshold, identifying the video content as the fuzzy video content copy of the original video content.

2. The method of claim 1, wherein the method further comprises, prior to the receiving the identifier, performing a search for the video content on a data transmission network, the search being based on at least one search parameter search parameter selected from: keywords in a file name, keywords in a description, accompanying images, and file metadata.

3. The method of claim 1, wherein the method further comprises pre-defining the value N as a function of a length of video content.

4. The method of claim 1, wherein the identifying the sequence of scenes, comprises executing a comparison of extracted hash sums of at least fragments of adjacent frames, and wherein the method further comprises identifying a scene change in response to a Hamming distance between hash sums of adjacent frames exceeding a predefined threshold.

5. The method of claim 1, wherein the creating the scene sequence vector comprises generating the scene sequence vector based on a total number of frames in the scene.

6. The method of claim 1, wherein the scene sequence vector is a vector of at least two disjoint subsets of scenes of the received video content.

7. The method of claim 6, wherein the identifying the video content as the fuzzy video content copy of the original video content is executed based on the comparing the overlap of the scene sequence vectors of the at least two disjoint subset of scenes.

8. The method of claim 1, wherein during the comparing, the method further comprises additionally comparing at least one frame from the scene of the received video content with at least one frame from the corresponding scene of the original video content, forming at least one comparative pair of frames.

9. The method of claim 8, wherein the method further comprises extracting hash sums of the comparative pairs of frames and wherein the comparing the at least one frame comprises comparing hash sums.

10. The method of claim 1, wherein the method further comprises comparing meta data of the identified fuzzy copy of video content and metadata of the original video content, and wherein in response to a difference in compared metadata, the method further comprises executing an additional search for additional fuzzy copies of video content containing metadata identical to the metadata of the identified fuzzy copy of video content.

11. The method of claim 1, wherein a length of the fuzzy copy differs from the length of original video content.

12. The method of claim 1, wherein, the method further comprises after identifying the fuzzy copy of video content, storing an identifier for the fuzzy copy of the video content in a fuzzy copy database.

13. A computer device configured to automatically identify fuzzy copies of video content, the computer device having access to a original video content database, the computer devices being connectable to a data transmission network; the computer device including a communication interface and at least one computer processor that is functionally connected to the communication interface, the at least one computer processor being configured to:

receive an identifier of video content in a form of a video stream;

extract each Nth frame from the video stream to obtain a sequence of frames, where N is greater than one;

identify a sequence of scenes by comparing at least fragments of adjacent frames from the sequence of frames;

create, based on the sequence of scenes, a scene sequence vector;

obtain, from the original content database, a template vector representative of an original sequence of scenes of at least one template of an original video content;

compare the scene sequence vector with the template vector;

in response to the comparing identifying that the scene sequence vector and the template vector overlap to a degree that exceeds a predefined threshold, identify the video content as the fuzzy video content copy of the original video content.

14. The device of claim 13, wherein the at least one computer processor is further configured to perform a search for video content on a data transmission network, the search being based on at least one search parameter selected from: keywords in the a name, keywords in a description, accompanying images, and file metadata.

15. The device of claim 13, wherein the at least one computer processor is further configured to perform a comparison of extracted hash sums of at least fragments of adjacent frames and to identify the boundary of the scene in response to the Hamming distance between hash sums of adjacent frames exceeding a predefined threshold.

16. The device of claim 13, wherein the at least one computer processor is further configured to create the scene sequence vector based on a total number of frames in the scene.

17. The device of claim 13, wherein the at least one computer processor is further configured to create the scene sequence vector based on at least two disjoint subsets of scenes of received video content.

18. The device of claim 17, wherein the at least one computer processor is configured to identify the fuzzy copy of the original video content in response to the scene sequence vector of at least two disjoint subsets of scenes of received video content overlapping with at least a portion of the vector of the sequence of scenes of the original video content.

* * * * *